Patented Feb. 21, 1939

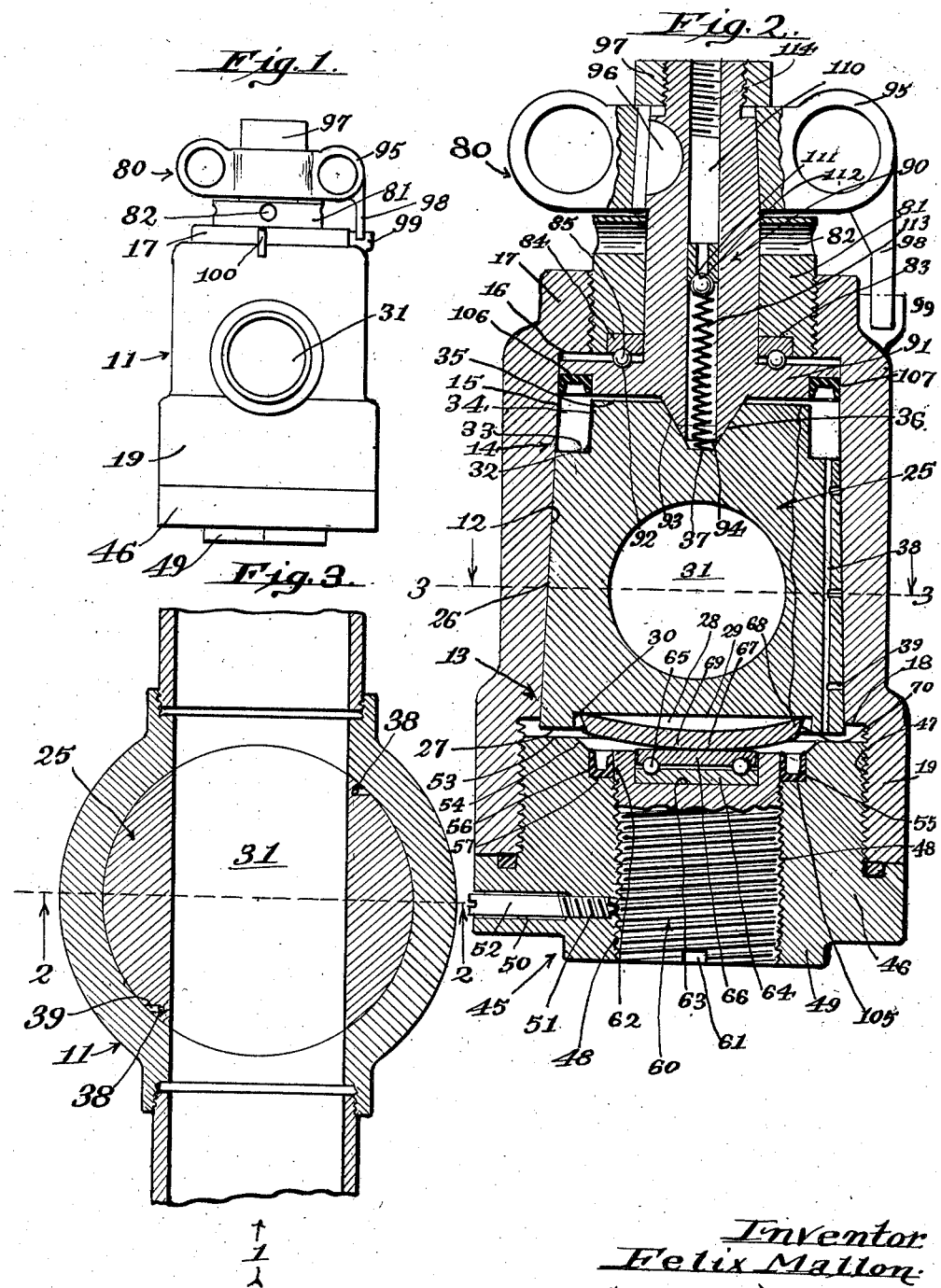

2,147,851

UNITED STATES PATENT OFFICE 2,147,851

STOPCOCK

Felix Mallon, Long Beach, Calif.

Application November 4, 1936, Serial No. 109,103

2 Claims. (Cl. 251—93)

My invention relates to a stop cock of the type having a tapered plug engaging a tapered seat in the wall of the valve body or casing and in which the plug is held firmly seated by the action of a spring, also in which the plug is slightly released from its seat should there be considerable resistance to the rotating of the plug from its open to its closed position and vice versa.

In the above type of stop cock one of the objects and features of my invention is in a releasing means utilized in turning the plug should there be a considerable resistance to turning the plug when firmly seated. However, this releasing device does not unseat the plug a sufficient amount to permit grit or other dirt passing between the periphery of the plug and its seat. A characteristic of this releasing device is that when the plug is so firmly seated that it is difficult to turn, that as a turning force is applied to turn the plug it is moved slightly longitudinally a sufficient amount to release the plug and then the seating spring again seats the plug. Usually in this type of plug the frictional resistance to turning is greatest before any turning movement has been developed but once the movement of rotation of the plug starts the friction decreases and the turning is then quite easy from for instance, the closed to the open position or vice versa.

Considered in more detail, an object and feature of my invention as to the releasing feature of the plug consists of having a wedge shaped groove in the small end of the plug extending substantially from side to side. This is engaged by a wedging key of similar shape formed integral or attached to a rotatable stem, such stem having a handle or a finger grip for rotating the same. The plug is maintained firmly seated and hence with the wedging groove engaging the wedging key of the stem so that should the resistance to turning be normal, that is not excessive, there need be no lifting action on the plug. However, if the friction restraining the plug from rotation is considerable the twist given to the stem causes a slight wedging interaction between the tapered key and the tapered groove of the plug, thus moving the plug slightly longitudinally towards the large end of its conical seat to relieve the frictional resistance. The moment the plug starts turning, however, the seating spring forces the groove firmly against the key of the stem and the periphery of the plug against its seat in the valve casing. Another feature dealing with the mounting of the stem consists in employing an adjusting sleeve threaded into the valve housing and having one race of an anti-friction thrust bearing, the opposite race for this bearing being formed by a flange on the stem.

Another feature of my invention relates to the construction and assembly of the seating spring for the plug in the valve assembly. A feature of my invention in this regard is the employment of an arched leaf spring fitted in a recess in the large end of the plug in which the two ends of a spring engage the bottom of the flat recess adjacent diametrically opposite sides of the plug. The center portion of this spring on its convex side bears against a rotatable bearing plate, this forming part of an anti-friction bearing located in an adjusting plug threaded through the head of the valve housing. Thus by varying the position of the adjusting plug the degree of compression of this leaf spring may be varied in order to obtain the desired seating contact of the tapered plug on its tapered seat.

Another feature of my invention resides in a leak-preventing means consisting of employing annular packing cups at both ends of the valve. At the small end the cup fits on the flange of the rotatable stem and bears against the wall of a chamber at the small end of the tapered conical seat of the valve housing. The annular packing cup at the large end of the plug is located in an annular recess in the head attached to the valve housing and engages a cylindrical portion of the threaded adjusting plug. In connection with the use of the annular packing cups I provide a construction for lubricating the stop cock, that is, the peripheral portion of the plug in engagement with the seat. This is done by providing a grease duct with a check valve through the center of the valve stem, this having a discharge end through the center portion of the key fitting in the keyway groove of the plug.

As the keyway extends from side to side of the small end of the valve plug, a passage is formed between the plug and the groove keyway leading the grease to an annular chamber or space adjacent the peripheral edge of the small end of the plug. A grease duct extending entirely through the plug from the small to the large end carries this grease to a chamber at the large end, this being the end having the leaf spring for adjusting the pressure. Hence the pressure of grease is equalized at both ends of the plug. However as the large end has a larger area than the small end of the plug, the tendency of the grease pressure is always to maintain the plug seated. Provision is made for lubricating the peripheral wall of the valve plug and its complementary valve seat by openings extending from the longitudinal duct through the plug to the peripheral wall of such plug.

My invention is illustrated in connection with the accompanying drawing, in which:

Fig. 1 may be considered as a front elevation of the valve taken in the direction of the arrow 1' of Fig. 3.

Fig. 2 is a vertical section on the line 2—2 of Fig. 3 in the direction of the arrows, certain parts being shown in elevation.

Fig. 3 is a transverse section on the line 3—3 of Fig. 2 in the direction of the arrows.

In my valve I utilize a valve housing 11 which has a tapered valve seat 12, this being slightly coned with the large end at 13 and the small end at 14. There is preferably a cylindrical section 15 continuing from the apex of the taper to a shoulder 16 formed by a reduced neck 17, this neck being interiorally threaded. At the large end there is a transverse annular shoulder 18 and from such shoulder there extends an annular head receiving end 19 which is interiorally threaded.

The valve plug designated by the assembly 25 has a tapered peripheral wall 26 conforming to the taper of the seat of the housing terminating at the large end in a flat transverse surface 27 in which is located a recess 28 extending diametrically across the large end of the plug. This recess has a flat bottom surface 29 and right angular ends 30. The port 31 is shown as cylindrical but of course it may be other shapes as is common in this type of valve. At the small end 32 of the plug there is an annular transverse surface 33, a cylindrical surface 34 and a flat transverse end 35. This end is provided with a somewhat V shaped keyway groove 36 extending diametrically across the small end of the plug or across a portion of this small end. This groove is shown as having a flat apex 37 and the sides of the groove are symmetrical in regard to a central plane through the center of the groove. A plurality of grease ducts 38 extend through the groove from the annular surface 34 to the flat end 27 and have a series of outlets 39 to the periphery of the plug to feed grease to the bearing surface between the seat and the plug.

The seating assembly for the plug designated by the numeral 45 has a head 46 with a threaded portion 47 threaded in the threads of the head receiving end 19. This head has an internally threaded bore 48. The head is provided with a wrench grip end 49 and a lateral perforation 50 having a threaded portion 51 for a locking set screw 52. The head has a flat annular transverse surface 53 on its inner end, a converging annular surface 54 and an annular recess 55 formed by preferably a cylindrical surface 56 and an annular transverse surface 57.

An adjusting plug 60 is exteriorally threaded having a kerf 61 at its outer end for threading in the threaded bore 48 of the head. The inner end of this plug has a cylindrical surface 62. The inner end of the head is provided with a recess 63 in which is located a bearing plate 64 having a race for an anti-friction ball bearing 65. The complementary race is provided by a disc 66. A leaf spring 67 is bent to form an arch with the ends 68 bearing on the flat surface 29 of the recess 28 at the head of the plug. The center of the convex side 69 bears against the center of the disc 66. This spring preferably has tapered ends 70 and is a suitable width and thickness to give the desired spring pressure for maintaining a desirable pressure between the plug and its seat of the valve housing.

The valve turning assembly, designated by the numeral 80, has an adjusting sleeve 81 exteriorally threaded in the threads of the neck 17, this sleeve being provided with spanner wrench sockets 82. The inner end of this adjusting sleeve has an annular recess 83 in which is located the ring bearing 84 on which operate the thrust ball bearings 85.

The valve stem 90 extends through the adjusting sleeve and of course must be assembled prior to or when attaching the sleeve to the valve housing. This sleeve has a flange 91 with a groove 92 forming the complementary seat for the balls of the ball thrust bearing. Extending transversely across the inner end of the stem is a wedge shaped key 93. This is complementary in shape to the grooved keyway 36. The key terminates in a flat apex 94 so that it does not contact the apex 37 of the keyway. A finger grip handle 95 is fitted on the stem preferably on a tapered portion and secured by a key 96 and held in place by a nut 97. The handle is provided with a finger 98 extending from one side which is adapted to contact two stops 99 and 100 extending outwardly from the neck portion of the housing.

A leak prevention means consists of an annular packing cup 105 fitted in the head 46 and engaging the transverse annular surface 57 and the cylindrical surface 56 of the head and the cylindrical surface 62 of the plug 60. A second cup packing ring 106 is located in a corner recess 107 of the flange 91 of the stem. This has an outer wall engaging the cylindrical surface 15 at the base or small end of the valve seat in the valve casing. The stem is provided with a grease duct 110 having a check valve seat 111 with a ball check valve 112 maintained closed by a spring 113. This spring bears against the ball and against the apex 37 of the keyawy groove 36. The outer end of the duct 110 is provided with threads 114 for attachment of a high pressure greasing connector.

The manner of operation and functioning of my invention is substantially as follows: The stop cock may be assembled by having the head and the plug removed and also the assembly of the stem 110 and the adjusting sleeve 81 removed. The stem may then be inserted through the large end of the valve housing, the adjusting sleeve slipped over the stem and threaded into place on the neck 17. The operating handle 95 may then be secured to the stem and secured with the nut 95. The plug is then inserted, the keyway of the plug engaging the key of the stem. After this the spring 67 is located in the recess 28. The head 46 with the adjusting plug 60 may then be installed. It is desirable before finally seating the plug to insert grease through the grease duct 110. The adjusting plug 60 may then be threaded inwardly gripping the spring 67 and thus thrusting the plug inwardly and at the same time loosening the adjusting sleeve 81 until the plug has a sufficiently tight bearing on its seat, however allowing a reasonably free rotation of the plug by the stem. The locking set screw 52 is then adjusted to clamp the adjusting plug 60.

In the operation of the valve by the stem, if the plug does not stick and rotates freely, the key 93 functions merely as an interlocking connection with the grooved keyway 36 for rotating the plug between its open and its closed position, these two positions being limited by the finger 98 engaging the stops 99 and 100 on the valve housing. However should the friction to turning of the plug be excessive, the torsional forces applied to the finger grip handle 95 cause a wedging action of the sloping wedge shaped face of the key operating against the complementary wedge shaped side face of the key groove 36. This action tends to force the plug slightly outwardly towards the large end of the seat, this action being against the compression of the arched leaf spring 67. However, this movement is not sufficient to create a sufficiently large annular space between the plug and its seat to allow entrance of grit or dirt therebetween but as soon as the resistance to rotation is lessened so that the plug may be turned, the leaf spring 67 again causes a tight fit of the key in the keyway for completing the rotation of the plug.

It will be apparent that the thrust bearing between the flange 91 of the stem and adjusting sleeve 81 will permit rotation of the stem even with a considerable end pressure against the stem through the interconnecting faces of the key in the keyway. Also as the plug is rotated the friction between the arched spring 67 and the bearing disc 66 may rotate this disc due to the antifriction bearing in the adjusting plug 60. This bearing also permits the disc 66 to remain stationary while the plug is being threaded to develop the desired pressure on the spring and thereby tensioning such spring. The annular packing cups 105 and 106 prevent any leakage of grease or of the fluid carried by the valve should any of this work between the plug and the seat of the housing.

Various changes may be made in the details of the construction without departing from the spirit or scope of the invention as defined by the appended claims.

I claim:

1. A stop cock comprising in combination a housing having a tapered seat with an opening at the small end and a threaded opening at the large end, a closure head threaded therein, an adjusting plug threaded in the said head, a tapered valve plug engaging the tapered seat, a stem extending through the opening at the small end of the housing and having an operative connection to the plug for rotating same, a flange on the stem, a spring with means engaging between the adjusting plug and the large end of the valve plug, the valve stem having a grease duct extending therethrough, the flange of the stem having an annular cut-out corner with a packing cup fitting in said corner and engaging the inside of the valve housing at the end of the tapered seat, the head having an annular cut-out inner section, a second packing ring fitted in said section and engaging the adjusting plug, the valve plug having a grease duct extending between its small and large end with grease outlets to the face of the plug.

2. A stop cock comprising in combination a valve housing having a tapered valve seat, a threaded opening at the small end of the housing, a sleeve threaded therein, a stem extending through the sleeve and having a flange, the flange having an annular corner notch with a cup shaped annular packing therein engaging between the flange and the inside of the housing, a slip connection between the stem and the plug and having a communicating passage between the stem and the plug to the periphery of the plug, the stem having a grease passage leading therethrough, a closure means at the large end of the plug having a spring engaging such large end to resist displacement of the plug whereby the plug may be rotated by the stem by a slight unseating and again seated by the said spring.

FELIX MALLON.